United States Patent [19]

Ehrlenspiel et al.

[11] Patent Number: 4,643,698

[45] Date of Patent: Feb. 17, 1987

[54] CONSTANT VELOCITY JOINT

[75] Inventors: Klaus Ehrlenspiel; Thomas John, both of Munich; Andreas Schuierer, Krailling, all of Fed. Rep. of Germany

[73] Assignee: Uni-Cardan Aktiengesellschaft, Fed. Rep. of Germany

[21] Appl. No.: 686,215

[22] Filed: Dec. 26, 1984

[30] Foreign Application Priority Data

Dec. 28, 1983 [DE] Fed. Rep. of Germany ....... 3347262

[51] Int. Cl.$^4$ .............................................. F16D 3/30
[52] U.S. Cl. ................................... 464/111; 464/106; 464/905
[58] Field of Search ..................... 464/69, 81, 84, 106, 464/112, 120, 137, 138, 904, 905, 111

[56] References Cited

U.S. PATENT DOCUMENTS

| | | | |
|---|---|---|---|
| 538,386 | 4/1895 | Rites | 464/81 X |
| 1,115,299 | 10/1914 | Francke | 464/81 |
| 1,623,582 | 4/1927 | Eckart | 464/138 |
| 3,263,447 | 8/1966 | Baker | 464/106 |
| 3,411,324 | 11/1968 | Federline | 464/69 |
| 3,477,249 | 11/1969 | Culver | 464/106 |
| 3,739,600 | 6/1973 | Pere | 464/69 |

Primary Examiner—Stuart S. Levy
Assistant Examiner—Daniel P. Stodola
Attorney, Agent, or Firm—Toren, McGeady and Goldberg

[57] ABSTRACT

A joint assembly for effecting an angularly movable torque transmitting connection between a driving and a driven member wherein at least three coupling members are connected to one of the driving and driven members for pivotal motion relative thereto about axes extending radially from the one member, wherein a ball and socket joint is interposed between the two members and wherein at least three circumferentially spaced pins arranged to extend radially from the other member are engaged with the coupling members to effect a torque transmitting connection between the driving and driven members while enabling angular displacement therebetween.

2 Claims, 4 Drawing Figures

CONSTANT VELOCITY JOINT

The present invention relates generally to constant velocity joints and particularly to an angularly movable torque transmitting connection between a driving and a driven member.

Angularly movable constant velocity universal joints for connecting two shafts are known in the prior art, for example, from DE-OS No. 32 03 139. In this prior art arrangement, there is provided at one shaft end in a joint yoke a frame-like coupling device which swivels about an axis and which contains a recess. A pin arranged on the other shaft extends in a direction transversely to the shaft axis and engages into the recess. For centering purposes, a centering ball is provided at the end of one shaft and calotte-shaped receiving means for centering the ball in the pin at the other shaft. In the course of producing such a joint, it has been found that the joint is sensitive to play between the pin and the frame-like coupling device. If excessive play exists, the coupling device can no longer be accurately controlled. Furthermore, the coupling device will then not automatically move into the midline, but at certain angular positions of the shaft, it may assume any position. Furthermore, the transmitting capacity is limited because torque is transmitted through the coupling device at two diagonal points only.

The present invention is directed toward providing a constant velocity joint which is capable of compensating for angular offset between a pair of shafts or torque transmitting members with the function of the device of the invention being unaffected to such an extent by the play between the coupling members. Additionally, the invention seeks to provide a joint whose force transmitting ability is increased as compared with other prior art devices.

SUMMARY OF THE INVENTION

Briefly, the present invention may be described as a constant velocity joint for effecting an angularly movable torque transmitting connection comprising a driving member and a driven member, at least three coupling members, means attaching said at least three coupling members to one of said driving and driven members for pivotal motion relative thereto about three circumferentially spaced pivot axes extending radially relative to said one member, a ball and socket joint interposed between said driving and driven members, at least three circumferentially spaced pins on the other of said driving and driven members extending radially therefrom and articulation means interposed between said pins and said coupling members connecting said driving and driven members in torque transmitting engagement, while allowing angular displacement therebetween.

In the preferred embodiment of the invention, the articulation means comprise elongated slots formed in the coupling members into which the pins extend.

Thus, in accordance with the invention, the objectives are achieved in that, at the end of one of the members or shafts, the at least three circumferentially spaced coupling devices or members are mounted for swivelling motion about radial axes with the at least three circumferentially spaced pins being arranged at the other member to extend radially therefrom so that the coupling members and the pins may be engaged with each other so as to permit transmission of torque while allowing angular displacement between the coupled shafts or members. The articulation means of the invention may comprise longitudinal holes or slots in the coupling members into which cylindrical pins engage or, alternatively, longitudinal holes or slots may be formed in the pins with the coupling members engaging therein.

The ball and socket means may comprise an axially projecting centering ball provided at one shaft end and a member defining a recess at the other shaft end with the centering ball having more than half of its circumference accommodated within the recess.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
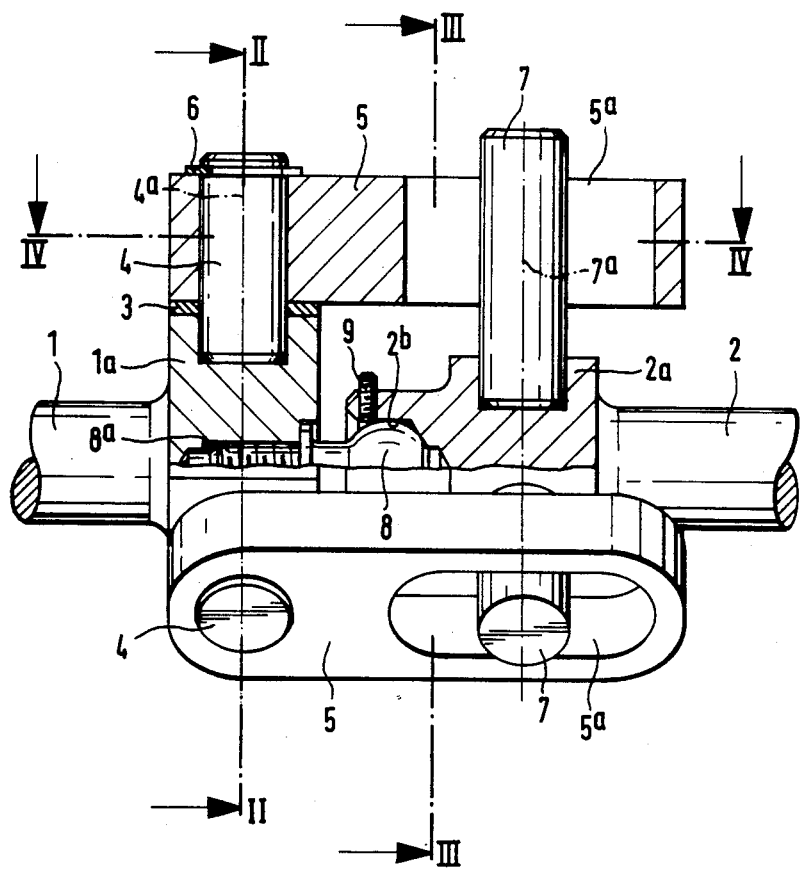
FIG. 1 is a partial sectional lateral view of a joint in accordance with the invention.
Figure 2:
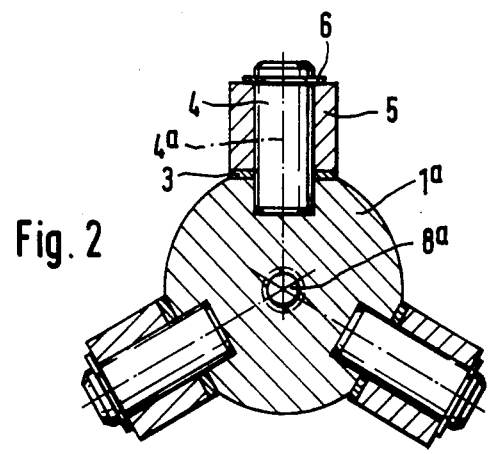
FIG. 2 is a sectional view taken along the line II—II of FIG. 1.

Referring now to the drawings, it will be seen that a constant velocity joint in accordance with the present invention is depicted, wherein a drive shaft 1 and an output shaft 2 which may comprise, respectively, a driving and a driven member, are connected in torque transmitting relationship while being capable of articulated angular movement therebetween.

The drive shaft 1 is provided with a flanged extension 1a and three radial driving pins 4 are equally circumferentially distributed about the drive shaft 1, the pins 4 being inserted into the extension 1a.

The joint includes three coupling members 5 with each of the coupling members 5 being pivotally supported at one of the pins 4 for swivelling or pivoted motion about an axis 4a at each of the pins 4, the axes 4a being circumferentially distributed about the drive shaft 1 and extending radially therefrom. A ring 3 is inserted between the coupling members 5 and the shaft extension 1a and the coupling members 5 are held on the pins 4 for pivotal movement relative thereto by a retaining ring 6.

At the end thereof, remote from the end connected to the driving pin 4, each of the coupling members 5 is formed with a longitudinal hole or slot 5a.

The output shaft 2 is formed with a flanged extension 2a with three equally circumferentially distributed radially extending driving pins 7 being attached to the shaft 2 at the extension 2a. The driving pins 7 are formed with pin axes 7a arranged at an angle of 120° from each other and the pins 7 are affixed to the shaft 2.

Each of the pins 7 extends radially into engagement within one of the slots 5a of the coupling members 5.

When the joint is in an extended position, the pins 7 are positioned approximately in the center of the longitudinal slots 5a.

Each of the pins 7 is formed with a cylindrical face while the longitudinal slots 5a have even faces in the transmitting direction so that a linear contact is produced.

Figure 3:
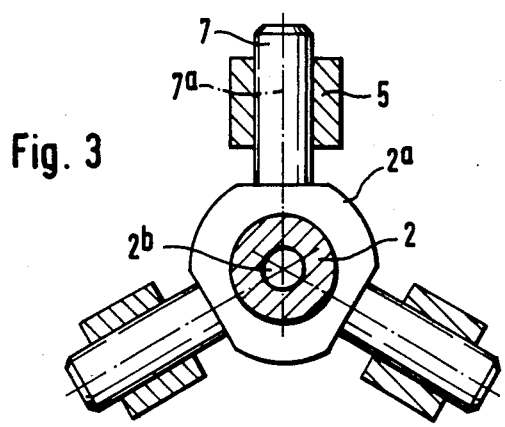
FIG. 3 is a sectional view taken along the line III—III of FIG. 1.
Figure 4:
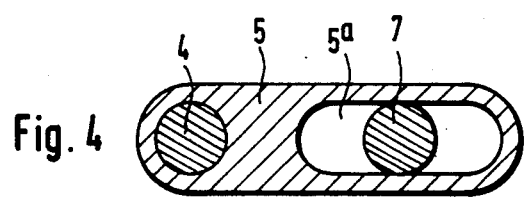
FIG. 4 is a sectional view taken along the line IV—IV of FIG. 1.

When the shafts rotate and the joint is in an articulated position, the drive pins 7 can slidingly move in the longitudinal slots 5a with a small amount of play only, as can be best seen in FIGS. 3 and 4. However, the cylindrical faces of the driving pins 7 may also be provided with roller bearings in order to reduce wear when the joint is in operation.

Interposed between the drive shaft 1 and the output shaft 2 is a ball and socket joint which includes a ball 8 with a threaded journal 8a which has been axially screwed into the flanged shaft extension 1a so that the ball 8 is fixed with its center of curvature on the axis of rotation of the shaft 1. The end face of the output shaft 2 is provided with a recess 2b into which the centering ball 8 is accommodated. In the embodiment shown, the ball 8 is held in the recess 2b by three radially extending circumferentially distributed threaded pins 9, only one of which is visible in FIG. 1. In this manner, the shafts 1 and 2 are defined axially relative to each other with the articulation of the joint being achieved with the center of the ball 8 being the pivot.

The angle of the embodiment of the joint which is shown in the drawings is approximately 15°, with this angle being limited by the driving pins 7 being stopped at the circular faces of the longitudinal slots 5a. The joint angle may be increased by lengthening the longitudinal slots 5a.

The invention is not restricted to the embodiment shown. Designs of the coupling devices 5 and pins 7 may be exchanged, for example, i.e., the radial pins 7 may be provided with longitudinal holes into which the cylindrical pin coupling devices 5 engage. Furthermore, the drive-mechanical coupling devices 5 may be replaced by flexible transmitting elements, such as leaf springs, or torsion bar springs or a combination of these, an arrangement in itself which provides a high degree of centering so that the centering device 2b, 8, 9 may be eliminated.

Thus, it will be seen that the constant velocity joint in accordance with the invention permits the transmission of torque and rotary motion under articulated conditions in any direction. With a larger number of transmitting coupling elements, the torque transmission will be greater than that transmitted by a tripod joint and, also, in comparison with the latter, it may be operated at a higher speed. Furthermore, control problems such as might occur in prior art joints such as that described in DE-OS No. 32 03 139 at certain angles will be avoided.

It has been found that with the connection in accordance with the present invention that between at least three circumferentially spaced pins 7 and three circumferentially spaced coupling members 5, the coupling means is effected by play to a much lesser extent than a connection using the frame coupling means. The longitudinal hole coupling means proposed by the invention will tend to adjust itself in the midline at all angular positions of the shafts so that constant velocity of the shafts is insured. There are at least three transmitting elements and theoretically their number may be increased to any figure so that the torque transmitting capability is accordingly increased.

Furthermore, as compared to the tripod joint, the three pin joint in accordance with the invention has a considerable advantage in that there is no orbital error so that in an articulated condition, the joint may be run at a very much higher speed than a tripod joint.

An additional important feature of the invention is that the distance between the center of the centering ball 8 and a plane passing through the swivel axes, on the one hand, and a plane passing through the pin axes, on the other hand, are identical. These equal distances are insured in that more than half of the centering ball is accommodated in the preferably spherical recess 2b so that the pivot is fixed.

The coupling device is preferably provided on a flanged extension of the shafts since, in this way, a sufficiently long distance between the coupling device and the pivot is insured and the required joint angle is achieved. A joint angle of 15° or more may be achieved and apart from the aforementioned radial distance between the coupling devices and the pivot, it is determined by the length of the longitudinal holes 5a.

Since, under articulation conditions and when torque is transmitted, the pins carry out vibrational movements, the cylindrical faces of the pins may be provided with roller or needle bearings in order to reduce friction.

The drive-mechanical coupling devices used in accordance with the present invention may be replaced by flexible coupling elements or they may be combined therewith. Flexible coupling elements may, for example, comprise leaf springs whose ends are supported so as to be articulated on pins arranged on shaft flanges. The coupling means may, for example, be a drive-mechanical longitudinal hole coupling means or a leaf spring. When using flexible coupling elements, and when the joint is articulated, returning forces occur adversely affecting the efficiency of the joint. However, when using leaf springs, there may be production-technical advantages so that the reduced efficiency may be acceptable.

While specific embodiments of the invention have been shown and described in detail to illustrate the application of the inventive principles, it will be understood that the invention may be embodied otherwise without departing from such principles.

What is claimed is:

1. A constant velocity joint for effecting an angularly movable torque transmitting connection comprising: a driving member and a driven member; at least three coupling members; means attaching said at least three coupling members to one of said driving and driven members for pivotal motion relative thereto about three circumferentially spaced pivot axes extending radially relative to said one member; a ball and socket joint interposed between said driving and driven members; at least three circumferentially spaced pins on the other of said driving and driven members each having an axis extending radially therefrom; and articulation means interposed between said pins and said coupling members connecting said driving and driven members in torque transmitting engagement while allowing angular displacement therebetween; said articulation means comprising longitudinal slots formed in said coupling members within which said circumferentially spaced pins engage for longitudinal movement relative thereto; said ball and socket joint comprising a centering ball attached to one of said driving and driven members and a socket formed in the other of said driving and driven members within which said centering ball engages, said centering ball having a center which is equidistant between a plane passing through said pivot axes of said coupling members and a plane passing through said axes of said three pins.

2. A joint according to claim 1, wherein said one member is formed with a flanged extension upon which said coupling members are mounted.

* * * * *